United States Patent
Bendi et al.

(10) Patent No.: US 9,100,831 B2
(45) Date of Patent: Aug. 4, 2015

(54) DISABLING MOBILE DEVICES THAT ORIGINATE MESSAGE SERVICE SPAM

(71) Applicant: Cellco Partnership, Basking Ridge, NJ (US)

(72) Inventors: Sethumadhav Bendi, Walnut Creek, CA (US); Bradley D. Cooper, Orchard Lake, MI (US); Jerry M. Kupsh, Concord, CA (US); Kenneth M. Potas, Carleton, MI (US); Lodema M. Steinbach, Clayton, CA (US)

(73) Assignee: Cellco Partnership, Basking Ridge, NJ (US)

( * ) Notice: Subject to any disclaimer, the term of this patent is extended or adjusted under 35 U.S.C. 154(b) by 183 days.

(21) Appl. No.: 13/862,910

(22) Filed: Apr. 15, 2013

(65) Prior Publication Data

US 2014/0308920 A1    Oct. 16, 2014

(51) Int. Cl.
- *H04M 1/66* (2006.01)
- *H04W 12/08* (2009.01)
- *H04L 12/58* (2006.01)
- *H04L 29/06* (2006.01)
- *H04W 12/12* (2009.01)
- *H04W 4/14* (2009.01)
- *H04W 4/12* (2009.01)

(52) U.S. Cl.
CPC ............. *H04W 12/08* (2013.01); *H04L 51/12* (2013.01); *H04L 63/101* (2013.01); *H04W 12/12* (2013.01); *H04W 4/12* (2013.01); *H04W 4/14* (2013.01)

(58) Field of Classification Search
USPC ........................................................ 455/410
See application file for complete search history.

(56) References Cited

U.S. PATENT DOCUMENTS

| | | | |
|---|---|---|---|
| 7,342,906 B1 * | 3/2008 | Calhoun | 370/338 |
| 2014/0004892 A1 * | 1/2014 | Murynets et al. | 455/466 |

* cited by examiner

*Primary Examiner* — Joel Ajayi

(57) ABSTRACT

A method performed by a network device may include receiving a mobile directory number (MDN) that has been identified as a mobile spam originator and generating a query for attributes of a mobile device registered with the MDN. The method also includes receiving a query response that include attributes of the mobile device and determining to block the mobile device from access to a network associated with the network device. The method further includes providing, by the network device and to a blacklist system, one or more of the device attributes.

20 Claims, 7 Drawing Sheets

US 9,100,831 B2

DISABLING MOBILE DEVICES THAT ORIGINATE MESSAGE SERVICE SPAM

BACKGROUND

Mobile communication devices enable users to communicate using various methods, including various message formats. A popular communication method available to users of mobile communication devices is the Short Message Service (SMS). SMS enables a first user to send a short text message to a second user. The message sent using SMS, variously referred to as an SMS message, an SMS text message, or as a text message, may be limited to a particular number of characters, such as, for example, 160 7-bit characters. Other popular message formats include the Multimedia Messaging Service (MMS) and Rich Communication Services (RCS). SMS, MMS, and RCS may be used to exploit the vulnerabilities of a mobile communication device to perform malicious activity that is undesirable to the user and/or the network associated with the mobile communication device.

DETAILED DESCRIPTION OF PREFERRED EMBODIMENTS

The following detailed description refers to the accompanying drawings. The same reference numbers in different drawings may identify the same or similar elements.

Systems and methods described herein may be used to prevent a mobile device from sending SMS message spam, and other mobile-originated message spam, by barring, from a service network, an electronic serial number (ESN), a mobile equipment identifier (MEID), and/or an international mobile equipment identity (IMEI) associated with the mobile device.

Mobile devices may be used by cybercriminals to send SMS, MMS, and/or RCS messages to deliver spam (such as certain types of unsolicited bulk messages). For example, a cybercriminal may cycle valid digit sequence combinations, such as Numbering Plan Area (NPA) and the first three digits of a phone number (NXX) combinations, to deliver SMS messages to valid mobile telephone numbers. A user may not be able to prevent receiving an unsolicited SMS message. Thus, SMS message spam can be especially troublesome to customers due to both the inconvenience and the fee customers may be charged per text message received under some service plans. Spam detection systems in some networks may block a particular mobile directory number (MDN) to prevent sending spam. However, if the same mobile device is later registered with a new MDN, spamming activities may continue from the same device. SMS systems typically do not store sufficient information to identify if a mobile device is using a different MDN. Implementations described herein may provide a solution to stop a mobile device from being used to send SMS, MMS and/or RCS spam messages by barring the mobile device from the network.

In one implementation, a method performed by a network device may include receiving an MDN that has been identified as an SMS spam originator and generating a query for attributes of a mobile device registered with the MDN. The method may also include receiving a query response that include attributes of the mobile device and determining to block the mobile device from access to a network associated with the network device. The method may further include providing, by the network device and to a blacklist system, one or more of the device attributes.

As used herein, the term "mobile device" may generally refer to user equipment that provides access to a subscription-based mobile cellular service. Also, the terms "spam" and "mobile spam" may generally refer to an unsolicited message (e.g., SMS message, MMS message, RCS message, etc.) sent from a mobile device. "SMS spam" may refer to an unsolicited text message sent from a mobile device.

Figure 1:
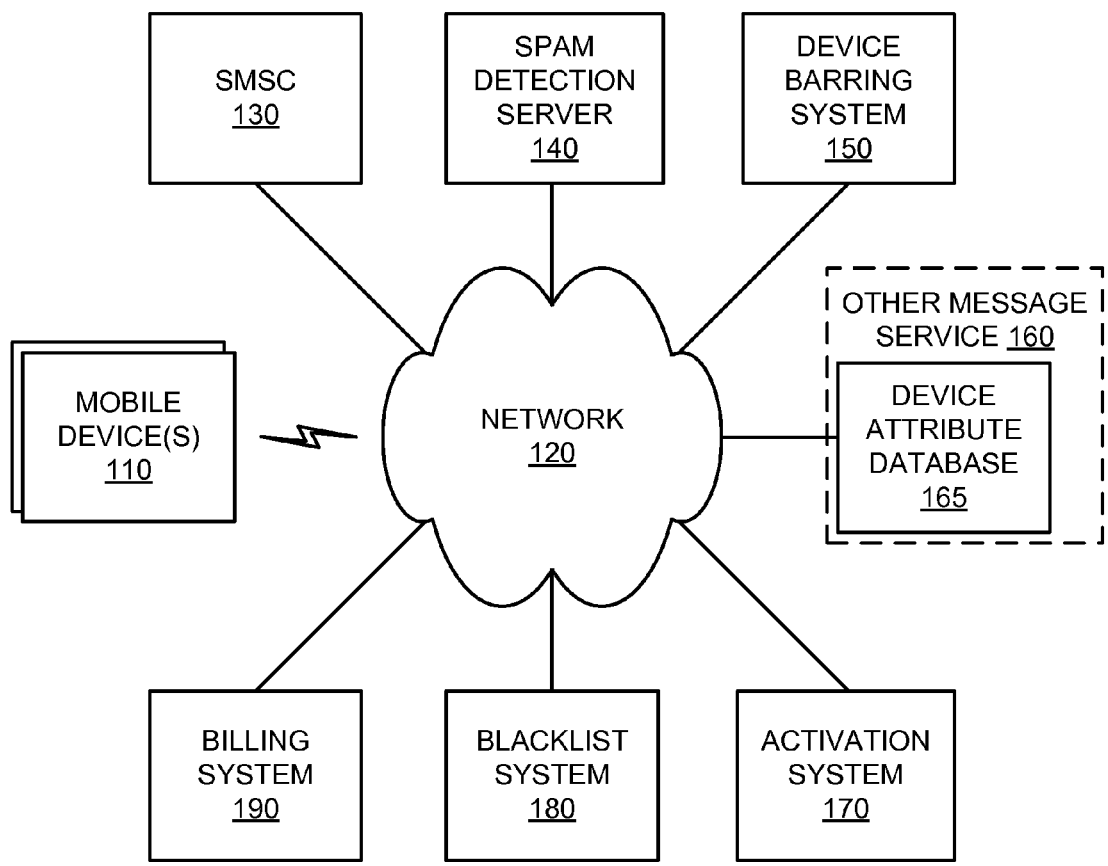
FIG. 1 is a diagram that depicts an exemplary network in which systems and/or methods described herein may be implemented.

FIG. 1 is an exemplary environment 100 in which systems and/or methods described herein may be implemented. As illustrated, environment 100 may include one or more mobile devices 110 (referred to herein collectively as "mobile devices 110" and individually as "mobile device 110"), a network 120, an SMS center (SMSC) 130, a spam detection server 140, a device barring system 150, another message service 160 that includes a device attributes database 165, an activation system 170, a blacklist system 180, and a billing system 190. A single instance of each device and network in environment 100 is shown in FIG. 1 for illustrative purposes. In practice, environment 100 may include multiple instances of the devices and/or networks. Also, the devices and/or networks of environment 100 may interconnect via wired and/or wireless links.

Mobile device 110 may include any device capable of sending and/or receiving SMS messages. For example, mobile device 110 may include a radiotelephone, a smart phone, a wireless device, a tablet, a personal digital assistant (PDA) (e.g., that can include a radiotelephone, a pager, Internet/intranet access, etc.), a laptop computer (e.g., with a wireless air card), a gaming device, or other types of computation or communication devices. In an exemplary implementation, mobile device 110 includes a device that is capable of communicating over network 120. According to implementations described herein, mobile device 110 may be compatible with one or multiple standards (e.g., code division multiple access (CDMA)-based standards, etc.) and configured with one or more of an ESN, MEID, or IMEI that uniquely identifies mobile device 110. Mobile device 110 may be configured to send and/or received messages using one or more of a SMS message service, an MMS message, or an RCS message service.

Network 120 may enable mobile device 110, SMSC 130, spam detection server 140, device barring system 150, other message service 160, activation system 170, blacklist system 180, and billing system 190 to communicate with each other. Network 120 may include one or more wired and/or wireless networks. For example, network 120 may include a cellular network, the Public Land Mobile Network (PLMN), a second generation (2G) network, a third generation (3G) network, a fourth generation (4G) network (e.g., a long term evolution (LTE) network), a CDMA network, a global system for mobile communications (GSM) network, a general packet radio services (GPRS) network, a combination of the above networks, and/or another type of wireless network that may be used by mobile devices 110 to connect to network 120. Additionally, or alternatively, network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

SMSC 130 may include one or more devices, such as network devices or server devices, for implementing SMS in a mobile telephone network, such as network 120. If a user (e.g., using mobile device 110) sends a text message (e.g., a SMS message) to another user (e.g., using another one of mobile devices 110), the message may be received and forwarded by SMSC 130 to the destination user. SMSC 130 may generally be responsible for locating the destination user and submitting the message to the destination user. SMSC 130 may employ one or more spam filtering processes in delivering SMS messages to their intended recipients. In implementations described herein, SMSC 130 may also send a real-time copy of each SMS message received from mobile device 110 to spam detection server 140.

Spam detection server 140 may include one or more devices, such as network devices or server devices, to receive and process SMS message copies from SMSC 130. Spam detection server 140 may identify, from the SMS message copy, an MDN of a spam originator (e.g., one of mobile devices 110). For example, spam detection server 140 may apply one or more detection algorithms to determine if spam is originating from a particular MDN. In one implementation, when spam detection server 140 identifies a spamming MDN, spam detection server 140 may notify device barring system 150 and/or other devices.

Device barring system 150 may include one or more devices, such as network devices or server devices, to solicit and/or store physical device data pertaining to an MDN received from spam detection server 140. For example, device barring system 150 may solicit mobile device attributes from network elements (e.g., application servers, etc.) outside the SMS system. Device barring system 150 may also implement rules (or algorithms) to determine if a device associated with a particular MDN is to be banned from a network (e.g., a cellular network within network 120). In one implementation, device barring system 150 may receive spam detection information from other message service 160 (e.g., MMS message spam, RCS message spam, etc.) to and implement a banning decision based on spam information from multiple systems (e.g., SMSC 130, and/or other message service 160). Additionally, device barring system 150 may communicate with other devices, such as activation system 170 or blacklist system 180 to forward device barring information.

Other message service 160 may include, for example, an MMS server, an RCS server, or another device in a message delivery system. Other message service 160 may enable delivery other message formats (such as images, video, etc.) between mobile devices 110. An multimedia messaging service center (MMSC), for example, may include one or more server entities that manage the receipt and transmission of MMS services between mobile devices 110. The MMSC may also include hardware and/or software-based logic to transcode an MMS message according to the device type and network access of a recipient mobile device 110. For example, the MMSC may convert an MMS message with a high resolution image (e.g., a JPEG image having 640×480 resolution with 24 bits of color) to a lower resolution image with less color depth (e.g. 120×165 and 8 bits of color). In another example, the MMSC may convert comparatively large audio\video file types to a smaller file formats. Other systems, such as an RCS system, may provide similar and/or additional services to provide device (e.g., mobile device 110) interoperability for different media formats.

In some implementations, other message service 160 may include one or more spam detection mechanisms to detect mobile spam originating from mobile devices 110. In another implementation, other messaging service 160 may operate similar SMSC 130 described above, by providing copies of messages from mobile devices 110 to spam detection server 140. In one implementation, other message service 160 may include a database of attributes for registered mobile devices 110, such as device attributes database 165.

Device attributes database 165 may be included, for example, within an MMSC system, a rich communication services (RCS) system, or another system (including a separate dedicated system) that tracks device attributes. Device attributes database 165 may include a centralized or distributed data structure. In one implementation, device attributes database 165 may be implemented as a lightweight directory access protocol (LDAP) database. Device attributes database 165 may store device type information used to determine if message content (e.g., MMS or RCS message content) needs to be adapted. For example, MMS messages may require adaptation of message content to ensure that the MMS message is received (e.g., by one of mobile devices 110) in a useable format. Device attributes database 165 may include information about individual mobile devices to associate an MDN with an ESN, MEID, and/or IMEI of mobile device 110 (along with other information about mobile device 110). For purposes of MMS message delivery, device attributes database 165 may be queried by devices within the MMSC portal to match mobile device types to MMS message formats. Device attributes database 165 may also be queried by devices outside of the MMSC portal (e.g., device barring system 150, etc.). According to implementations described herein, device attributes database 165 may also be used to cross-reference known spammer MDNs to physical device attributes, such as an ESN, an MEID, an IMEI, and/or a class of service (COS) associated with the particular MDN.

Activation system 170 may include one or more devices, such as network devices or server devices, to provision network elements and/or systems that require subscriber capabilities to be set. In one implementation, activation system 170 may include a proprietary system, such as the Mobile Telephone Activation System (MTAS). Activation system 170 may, for example, provide SMSC 130 with updated information to detect MDNs of known spam originators. Additionally, or alternatively, activation system 170 may provide blacklist system 180 with updated information to detect physical device attributes of known spam-originating mobile devices.

Blacklist system 180 may include devices, such as servers and/or databases, that store and provide identifying information about mobile devices reported as spam originators. In one implementation, blacklist system 180 may also include identifying information about mobile devices reported as lost or stolen. Blacklist system 180 may be carrier-specific or applied to multiple carriers. Blacklist system 180 may receive an ESN, MEID, or IMEI associated with a particular mobile device 110 and may store the ESN, MEID, or IMEI along with, for example, a status identifier (e.g., lost, stolen, or spammer). Blacklist system 180 may be accessible, for example, to service providers to check before honoring a request to activate one of mobile devices 110.

Billing system 190 may include one or more devices, such as a server device or another computation or communication device, that gather, process, search, and/or provide information in a manner described herein. Billing system 190 may provide billing services (e.g., account setup, account management, bill generation, etc.) for services (e.g., SMS) provided via network 120. In one exemplary implementation, billing system 190 may receive a request to activate one of mobile devices 110 and may generate a query to blacklist system 180 to validate the mobile device 110.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
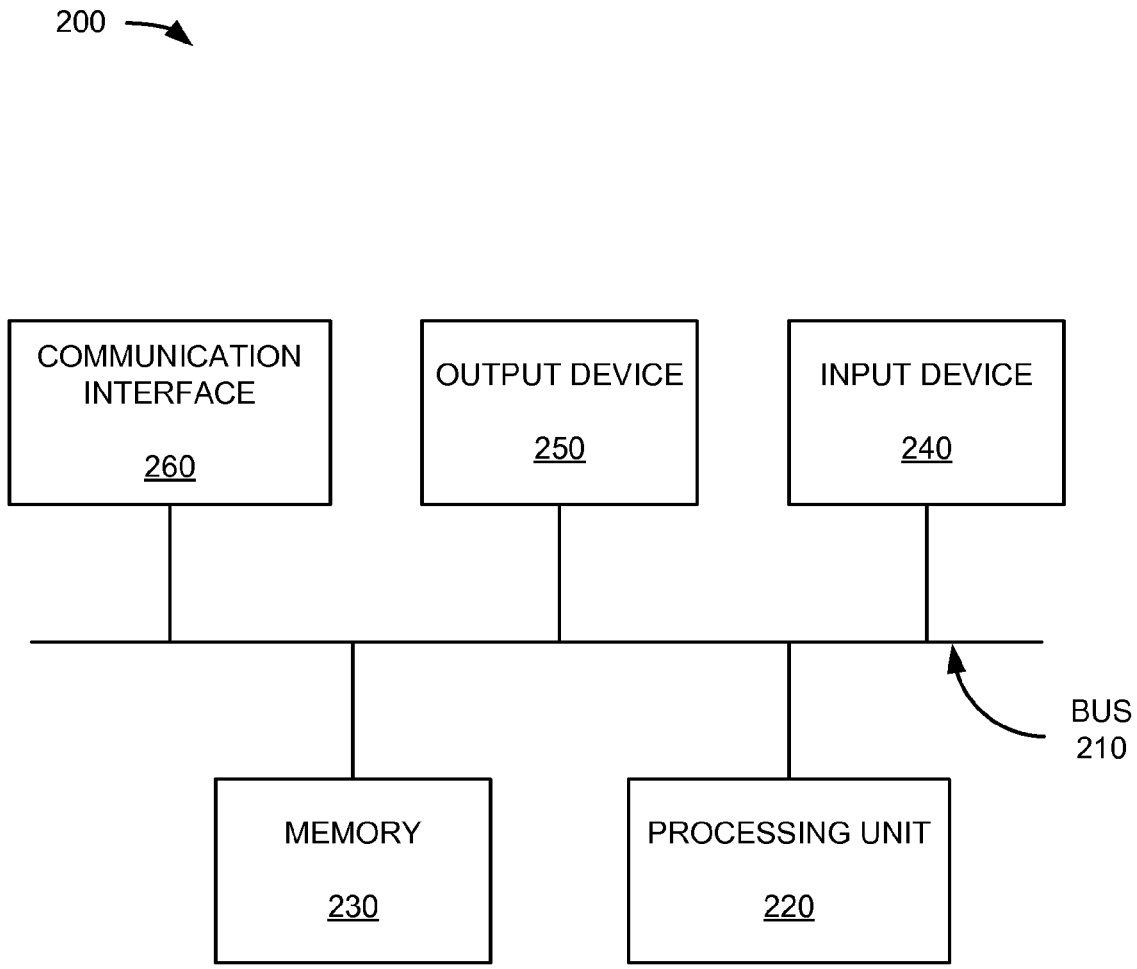
FIG. 2 is a diagram of exemplary components of a device that may correspond to one of the devices of the network depicted in FIG. 1.

FIG. 2 is a diagram illustrating exemplary components of a device 200. Each of mobile device 110, SMSC 130, spam detection server 140, device barring system 150, device attributes database 165, activation system 170, blacklist system 180, and billing system 190 may be implemented/installed as a combination of hardware and software on one or more of device 200. As shown in FIG. 2, device 200 may include a bus 210, a processing unit 220, a memory 230, one or more input devices 240, one or more output devices 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the user, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions stored in a computer-readable medium, such as memory 230. A computer-readable medium may include a non-transitory tangible memory device. A memory device may be implemented within a single physical memory device or spread across multiple physical memory devices. The software instructions may be read into memory 230 from another computer-readable medium or read into memory 230 from another device via communication interface 260. The software instructions stored in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

Figure 3:
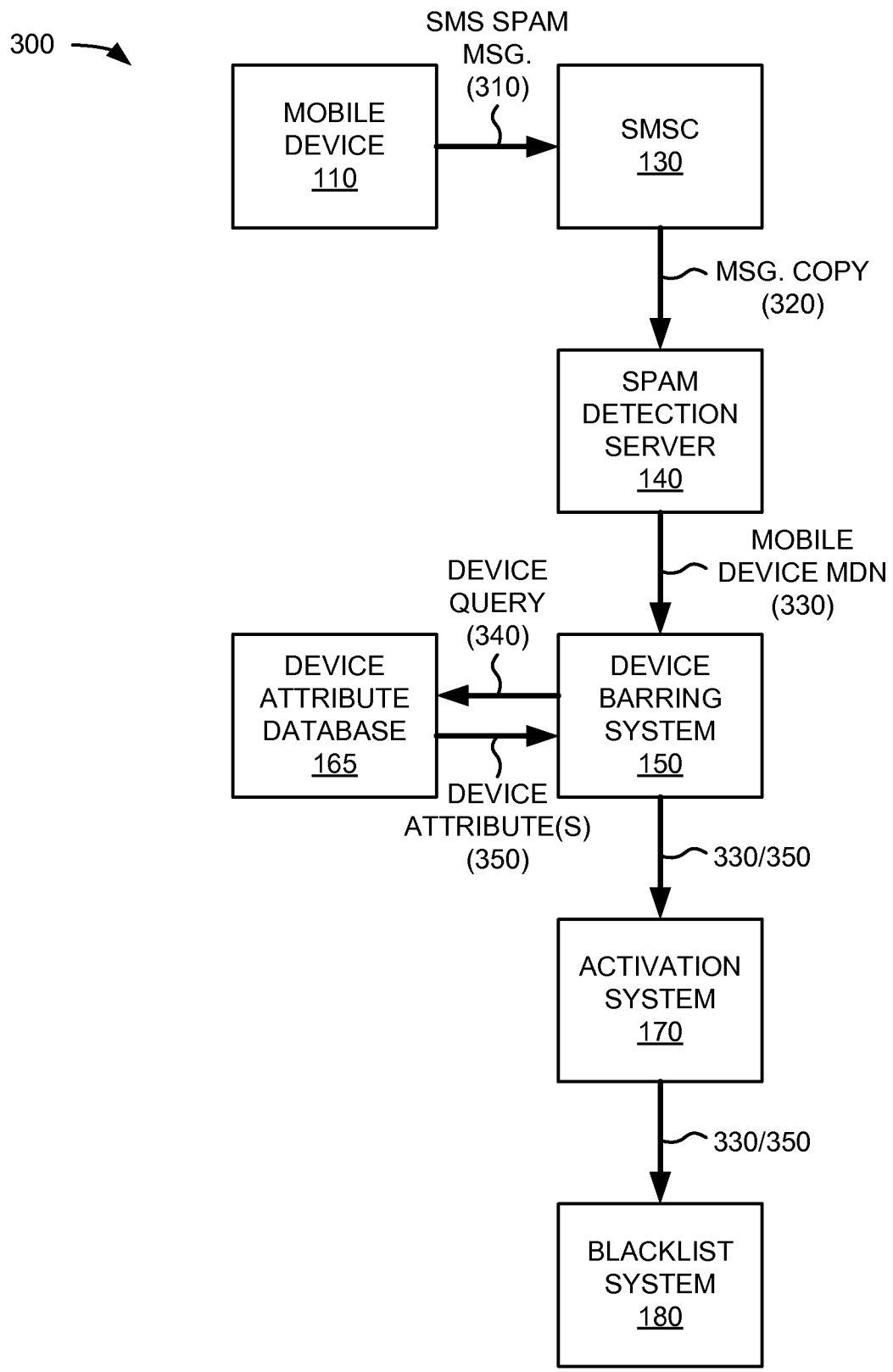
FIG. 3 is a diagram of exemplary communications among devices in a portion of the network of FIG. 1.

FIG. 3 is a diagram of exemplary communications among components of a portion 300 of environment 100 according to an implementation described herein. Communications in FIG. 3 may illustrate logging a spamming device (e.g., a mobile device 110 identified as a spam originator) with a spam device registry. As shown in FIG. 3, network portion 300 may include mobile device 110, SMSC 130, spam detection server 140, device barring system 150, device attributes database 165, activation system 170, and blacklist system 180.

As shown in FIG. 3, mobile device 110 may send a spam SMS message 310 directed, for example, to another mobile device (not illustrated). SMSC 130 may receive and process spam SMS message 310, including applying spam filtering to spam SMS message 310 and generating a real-time copy 320 of spam SMS message 310. SMSC 130 may forward copy 320 to spam detection server 140.

Spam detection server 140 may receive copy 320 and may determine if copy 320 indicates SMS spam. If spam is detected, spam detection server 140 may identify an MDN of mobile device 110 (e.g., the MDN of the mobile device identified as the spam originator). In one implementation, spam detection server 140 may apply one or more algorithms to determine if copy 320 is indicative of SMS spam. Spam detection may include, for example, employing algorithms to identify message parameters, analyzing content, analyzing sender behaviors, and/or applying user (e.g., potential recipient) feedback. In another implementation, spam detection server 140 may receive a signal or instructions from another device (e.g., SMSC 130 or a network gateway) to block a particular MDN. When spam detection server 140 determines that the MDN of mobile device 110 needs to be blocked, spam detection server 140 may send MDN 330 of mobile device 110 to device barring system 150.

Device barring system 150 may receive mobile device MDN 330 and, in response, may generate a device query 340 to device attributes database 165 to associate attributes (e.g., physical device data) of mobile device 110 with MDN 330. Device query 340 may include, for example, MDN 330 and/or other information (e.g., subscriber account information) that may be used to identify a particular device (e.g., mobile device 110) associated with MDN 330. In one implementation, device barring system 150 may automatically generate a query to device attributes database 165 to retrieve an ESN, an MEID, an IMEI, and/or a COS associated with the particular MDN.

Device attributes database 165 may receive device query 340 and, in response, may identify one or more device attributes 350 associated with MDN 330 (or the other information suitable to identify mobile device 110). Device attributes database 165 may permit cross-referencing of MDNs with one or more attributes of mobile device 110. Attributes available in device attributes database 165 may include an ESN, an MEID, and/or an IMEI that uniquely identifies mobile device 110. In one implementation, device attributes 165 may also associate a COS with MDN 330. In another implementation, device barring system 150 may query a different device/system than device attributes database 165 or multiple other devices and/or systems. Use of device attributes database 165 to identify device attributes of mobile device 110 may allow for a real-time (or near real-time) response from a network element, in contrast with, for example, a query to a remote billing system. Device attributes database 165 may provide device attributes 350 to device barring system 150.

Device barring system 150 may receive device attributes 350 and may determine if mobile device 110 needs to be banned. As described further herein in connection with FIG. 4, device barring system 150 may implement business rules (or algorithms) to determine if a device associated with a particular MDN is to be banned from a network (e.g., a cellular network within network 120). For example, device barring system 150 may detect that multiple MDNs have been used to originate SMS spam using the same mobile device 110 and determine that mobile device 110 should be barred. If device barring system 150 determines that a particular device is to be barred, device barring system 150 may forward MDN 330 and device attributes 350 (or a portion thereof) to blacklist system 180 via activation system 170.

Activation system 170 may receive MDN 330 and device attributes 350 from device barring system 150. In one implementation, based on the information from device barring system 150, activation system 170 may provision other devices in the SMS system (e.g., SMSC 130) to block SMS messages from the spamming MDN (e.g., MDN 330). For example, activation system 170 may update filters or COS status in SMSC 130 to block the particular MDN. Activation system 170 may also forward some or all of MDN 330 and device attributes 350 to blacklist system 180. In one implementation, activation system 170 may access blacklist system 180 via a secure, restricted connection. Blacklist system 180 may receive MDN 330/device attributes 350 and may store device attributes 350 for future retrieval.

Although FIG. 3 shows exemplary components of network portion 300, in other implementations, network portion 300 may include fewer, different, and/or additional components than depicted in FIG. 3. Alternatively, or additionally, one or more components of network portion 300 may perform one or more other tasks described as being performed by one or more other components of network portion 300.

Figure 4:
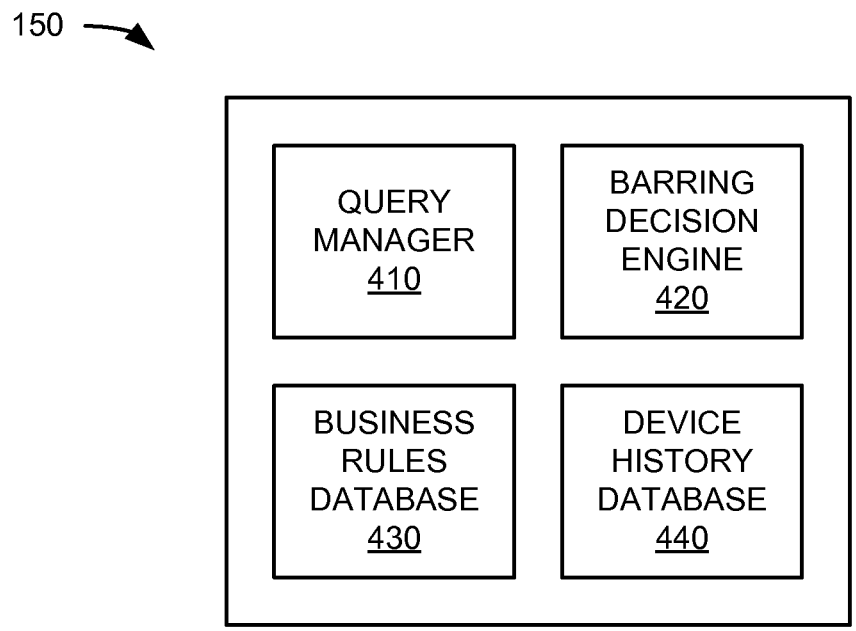
FIG. 4 is a diagram of exemplary functional components of a device barring system of FIG. 1.

FIG. 4 is a block diagram of exemplary functional components of device barring system 150. In one implementation, the functions described in connection with FIG. 4 may be performed by one or more components of device 200 (FIG. 2). Some or all of the functional blocks of FIG. 4 may be included, for example, in an application (e.g., software), stored in memory 230 and executed by processor 220. As shown in FIG. 4, device barring system 150 may include a query manager 410, a barring decision engine 420, a business rules database 430, and a device history database 440.

Query manager 410 may generate and send queries to one or more systems to associate an MDN with physical device attributes. For example, query generator 410 may receive MDN 330 from spam detection server 140 and may generate a query to device attributes database 165 to retrieve attributes, such as ESN, an MEID, an IMEI, and/or COS associated with MDN 330. Query manager 410 may receive query responses, such as device attributes 350, and may log an instance of the query and the query response in device history database 440.

Barring decision engine 420 may receive (e.g., from query manager 410) the device attributes associated with MDN 350 and may compare the device attributes with information in device history database 440. For example, in one implementation, barring decision engine 420 may compare the most recently received device attributes with previously-stored device attributes to determine if there are matching device attributes. Matching device attributes associated with different MDNs may be indicative of a single mobile device 110 sending spam from different accounts. In one implementation, barring decision engine 420 may apply one or more rules from business rules database 430 to determine if a mobile device associated with the matching attributes should be barred. In another implementation, the mere identification of matching attributes may indicate a mobile device should be barred. According to one implementation, barring decision engine 420 may incorporate spam detection information from other systems (e.g., MMS message spam, RCS message spam, etc.) to implement a banning decision. For example, device history database 440 may include device attributes collected from other spam reports of other message systems (e.g., an MMSC, an RCS system, etc.), and barring decision engine 420 may employ rules (e.g., from business rules database 430) that use matching attributes across multiple message systems (e.g., SMSC 130, an MMS system, and/or an RCS system).

Business rules database 430 may include one or more algorithms to drive decisions for barring mobile devices 110 from a network (e.g., a CDMA network within network 120). In one implementation business rules database 430 may be updated in real-time or as needed to reflect changing business rules for blocking SMS spam (and/or other mobile-originated spam) from the network.

Device history database 440 may be used (e.g., by query manager 410) to log instances of reported spam from a particular MDN. For example, query manager 410 may log in device history database 440 an entry for each instance and mobile device MDN (e.g., MDN 330) is received. Entries may include, for example, the MDN, an ESN, an MEID, an IMEI, a COS, a time entry, and/or other information associated with a particular mobile device. According to another implementation, device history database 440 may also store device attributes collected from other spam reports of other message systems (e.g., an MMSC, an RCS system, etc.). In one implementation, device history database 440 may include a table with separate fields to associate an MDN with an ESN, MEID, or IMEI. In another implementation, device history database 440 may be implemented by another type of data structure.

Although FIG. 4 shows exemplary functional components of device barring system 150, in other implementations, device barring system 150 may contain fewer, different, or additional functional components than depicted in FIG. 4.

Figure 5:
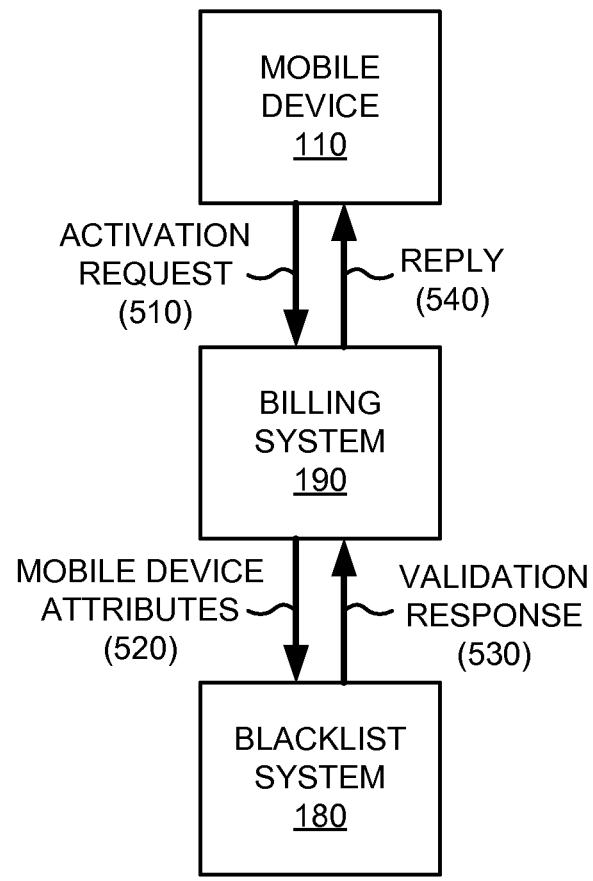
FIG. 5 is a diagram of exemplary communications among devices in another portion of the network of FIG. 1.

FIG. 5 is a diagram of exemplary communications among components of a portion 500 of environment 100 according to an implementation described herein. Communications in FIG. 5 may illustrate blocking MDN activation on a mobile device (e.g., a mobile device 110 identified as a spam originator). As shown in FIG. 5, network portion 500 may include mobile device 110, blacklist system 180, and billing system 190.

As shown in FIG. 5, mobile device 110 may submit an activation request 510 to billing system 190. Activation request 510 may be submitted directly to billing system 190 or via an intermediate device, such as a web server (not shown). In another implementation, activation request 510 may originate from another device using information from mobile device 110 (e.g., an ESN, MEID, or IMEI that uniquely identifies mobile device 110).

Billing system 190 may receive activation request 510 and, in response, may provide mobile device attributes 520 to blacklist system 180. Mobile device attributes 520 may include, for example, an ESN, MEID, or IMEI that uniquely identifies mobile device 110. Mobile device attributes 520 may be extracted, for example, from activation request 510. Blacklist system 180 may receive mobile device attributes 520 and may compare mobile device attributes 520 to stored entries to determine if mobile device 110 has been barred from accessing a network, such a CDMA network associated with billing system 190.

Blacklist system 180 may provide a validation response 530 to indicate whether activation of mobile device 110 is permitted to be activated. For example, if a matching ESN for mobile device 110 is found in blacklist system 180, a negative validation response 530 may be provided to billing system 190. Conversely, if a matching ESN for mobile device 110 is not found in blacklist system 180, a positive validation response 530 may be provided to billing system 190. Based on validation response 530, billing system 190 may provide a reply 540 to mobile device 110. For example, billing system 190 may either comply with or reject activation request 510.

Although FIG. 5 shows exemplary components of network portion 500, in other implementations, network portion 500 may include different components and/or additional components than depicted in FIG. 5. Alternatively, or additionally, one or more components of network portion 500 may perform one or more other tasks described as being performed by one or more other components of network portion 500.

Figure 6:
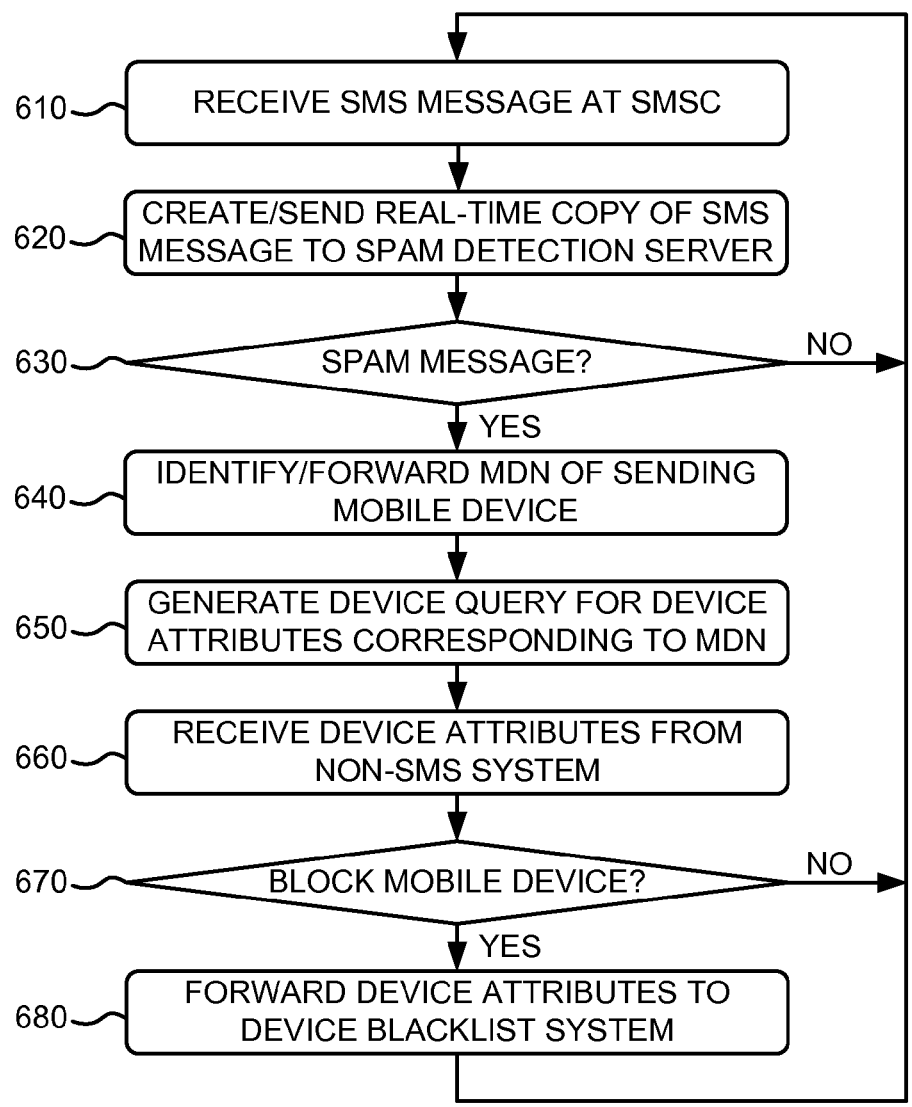
FIG. 6 is a flow chart of an exemplary process for blacklisting a spamming mobile device according to an implementation described herein.

FIG. 6 is a flow chart of an exemplary process for blacklisting a spamming mobile device according to an implementation described herein. In one implementation, process 600 may be performed by SMSC 130, spam detection server 140, and device barring system 150. In other implementations, some or all of process 600 may be performed by one or more other devices from environment 100, including or excluding SMSC 130, spam detection server 140, and device barring system 150. Process 600 is described with reference to components in figures described above.

As shown in FIG. 6, an SMS message may be received at an SMSC (block 610) and a copy of the SMS message may be created/sent to a spam detection server (block 620). For example, mobile device 110 may send a spam SMS message 310. SMSC 130 may receive spam SMS message 310 and generate a real-time copy 320. SMSC 130 may forward copy 320 to spam detection server 140.

It may be determined if the copy indicates an SMS spam message (block 630). If the copy is not an SMS spam message (block 630—NO), process 600 may return to process block 610. If the copy is an SMS spam message (block 630—YES), the MDN of the sending mobile device may be identified and forwarded (block 640). For example, spam detection server 140 may receive copy 320 and may determine if copy 320 indicates SMS spam by applying one or more detection algorithms. If no spam is detected, spam detection server 140 may take no action and proceed to evaluate another message copy. If spam is detected, spam detection server 140 may identify an MDN (e.g., MDN 330) of mobile device 110 and send MDN 330 to device barring system 150.

Process 600 may also include generating a device query for device attributes corresponding to the MDN (block 650) and receiving device attributes from a non-SMS system (block 670). For example, device barring system 150 may receive mobile device MDN 330 and, in response, may generate a device query 340 to device attributes database 165 to associate attributes (e.g., physical device data) of mobile device 110 with MDN 330. In one implementation, device barring system 150 may automatically generate a query to device attributes database 165 to retrieve an ESN, an MEID, an IMEI, and/or a COS associated with the particular MDN. Device attributes database 165 may receive device query 340 and, in response, may identify one or more device attributes 350 associated with MDN 330. Device attributes database 165 may provide device attributes 350 to device barring system 150.

It may be determined if the mobile device is to be blocked (block 670). For example, device barring system 150 may receive device attributes 350 and may determine if mobile device 110 needs to be banned from a network (e.g., a cellular network within network 120). In one implementation, device barring system 150 may implement business rules (or algorithms) to determine if a device associated with a particular MDN is to be banned. According to one implementation, business rules used by device barring system 150 may incorporate device attributes collected from other spam reports of other message systems (e.g., an MMSC, an RCS system, etc.).

If the mobile device is not to be blocked (block 670—NO), process 600 may return to process block 610. If the mobile device is to be blocked (block 670—YES), the device attributes of the sending mobile device may be forwarded to a device blacklist system (block 680). For example, if application of the business rules indicates that barring of the mobile device is not warranted, device barring system 150 may store a record of the reported MDN and query results (e.g., in device history database 440) for future comparison. If device barring system 150 determines that a particular mobile device is to be banned, device barring system 150 may forward MDN 330 and device attributes 350 (or a portion thereof) to blacklist system 180 via activation system 170.

Figure 7:
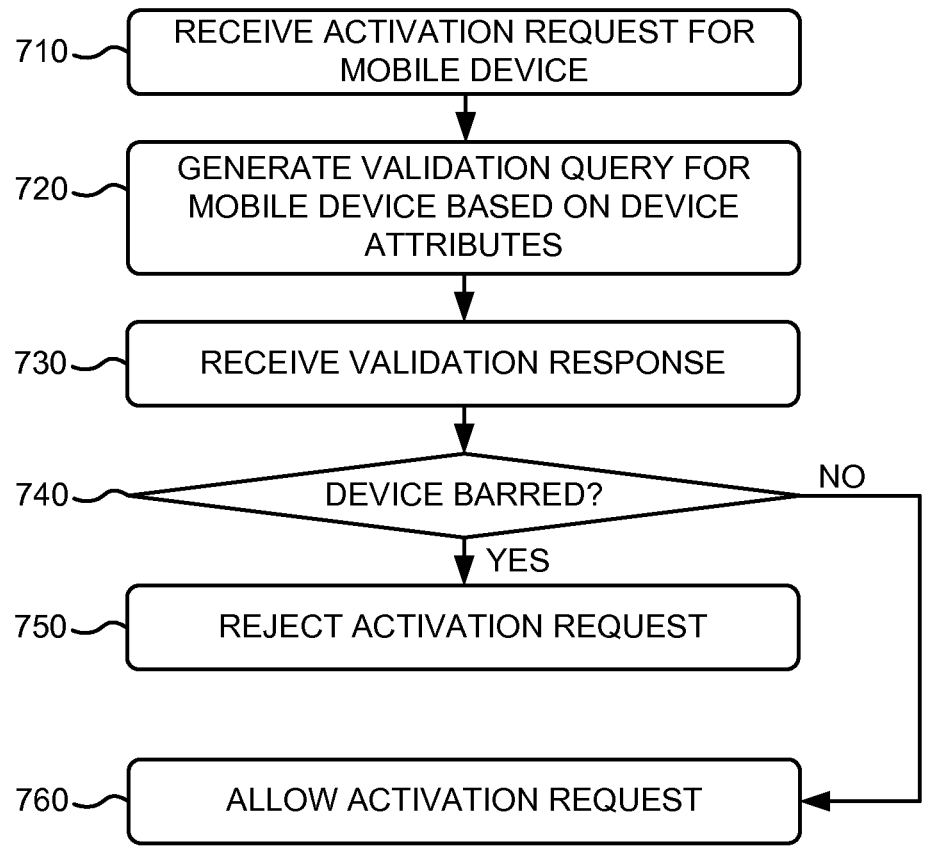
FIG. 7 is a flow chart of an exemplary process for performing a pre-activation device check according to an implementation described herein.

FIG. 7 is a flow chart of an exemplary process for performing a pre-activation device check according to an implementation described herein. In one implementation, process 700 may be performed by billing system 190. In other implementations, some or all of process 700 may be performed by one or more other devices from environment 100, including or excluding billing system 190. Process 700 is described with reference to components in figures described above.

As shown in FIG. 7, an activation request for a mobile device may be received (block 710), and a validation query for the mobile device may be generated based on the device attributes (block 720). For example, mobile device 110 may submit an activation request 510 to billing system 190. Billing system 190 may receive activation request 510 and, in response, may provide mobile device attributes 520 to blacklist system 180. Mobile device attributes 520 may include, for example, an ESN, MEID, or IMEI that uniquely identifies mobile device 110.

A validation response may be received (block 730), and it may be determined if the mobile device is barred (block 740). For example, blacklist system 180 may receive mobile device attributes 520 and may compare mobile device attributes 520 to stored entries to determine if mobile device 110 has been barred from accessing a network, such a CDMA network associated with a billing system 190. Blacklist system 180 may provide a validation response 530 to indicate whether activation of mobile device 110 is permitted.

If the mobile device is barred (block 740—YES), the activation request may be rejected (block 750). If the mobile device is not barred (block 740—NO), the activation request may be allowed (block 760). For example, based on validation response 530, billing system 190 may provide a reply 540 to mobile device 110. For example, billing system 190 may either comply with or reject activation request 510.

In systems and/or methods described herein, mobile devices that are identified as spam originators may be blacklisted from future MDN registrations. An MDN of a known spam-originating device may be blocked, and physical attributes (such as an ESN, an MEID, an IMEI, and/or a COS) of the mobile device may be stored in a blacklist directory. If an attempt is made to activate the same mobile device with a new MDN, physical attributes from the mobile device may be checked against the blacklist directory. If matching attributes are found in the blacklist directory, the activation request can be denied.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while device attributes have been described primarily in the context of an ESN, an MEID, and an IMEI, other attributes that uniquely identify a mobile device may also be imported from non-SMS systems. Also, while series of blocks have been described with respect to FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a network device, a mobile directory number (MDN) that has been identified as a short messaging service (SMS) spam originator;
   generating, by the network device, a query for attributes of a mobile device registered with the MDN;
   sending, by the network device, the MDN and the query to a non-SMS system;
   receiving, by the network device and from the non-SMS system, a query response including attributes of the mobile device that uniquely identify the mobile device;
   determining, by the network device and based on the received attributes of the mobile device, to block the mobile device from access to a network associated with the network device; and
   providing, by the network device and to a blacklist tracking system, one or more of the attributes of the mobile device.

2. The method of claim 1, further comprising:
   receiving, from the mobile device, a request to activate a different MDN;
   generating a query to the blacklist tracking system that includes the one or more of the attributes of the mobile device;
   receiving, from the blacklist tracking system, an indication that the mobile device is barred; and
   rejecting the request to activate the different MDN on the mobile device.

3. The method of claim 1, further comprising:
   receiving, at a short messaging service center (SMSC), an SMS message;
   creating a copy of the SMS message; and
   forwarding the copy of the SMS message to a spam detection device.

4. The method of claim 3, further comprising:
   determining, from the copy of the SMS message, that the SMS message is a spam message; and
   forwarding, to the network device, the MDN with an indication that the MDN is the SMS spam originator.

5. The method of claim 1, wherein the determining to block the mobile device includes:
   logging, in a database, an instance of the attributes from the query response,
   detecting, as matching attributes in the database, the instance and other instances of the attributes of the mobile device, and
   applying one or more rules to the matching attributes to determine whether to block the mobile device.

6. The method of claim 1, wherein the attributes of the mobile device include:
   an electronic serial numbers (ESN) associated with the mobile device,
   a mobile equipment identifier (MEID) associated with the mobile device, or
   an international mobile equipment identity (IMEI) associated with the mobile device.

7. The method of claim 6, wherein the attributes of the mobile device further include a class of service (COS) associated with the mobile device.

8. The method of claim 1, wherein the network associated with the network device is a code division multiple access (CDMA) network.

9. The method of claim 1, wherein the non-SMS system is a multimedia messaging service center (MMSC).

10. A device, comprising:
one or more memories to store instructions; and
one or more processors configured to execute the instructions in the one or more memories to:
  receive a mobile directory number (MDN) that has been identified as a short messaging service (SMS) spam originator;
  generate, based on receiving the MDN, a query for attributes of a mobile device registered with the MDN;
  send the query and the MDN to a non-SMS system;
  receive a query response including attributes of the mobile device;
  determine, based on the query response, whether to block the mobile device from access to a network associated with the device; and
  provide one or more of the attributes of the mobile device for use in a blacklist tracking system in response to a determination that the mobile device is to be blocked.

11. The device of claim 10, wherein, when determining whether to block the mobile device from access to a network associated with the device, the one or more processors are further configured to execute the instructions to:
  log, in a database, an instance of the attributes of the mobile device from the query response,
  detect, as matching attributes in the database, the instance and other instances of the attributes of the mobile device, wherein the other instances of the attributes of the mobile device are provided from one or more of an SMS system or the non-SMS system, and
  apply one or more rules to the matching attributes to determine whether to block the mobile device.

12. The device of claim 10, wherein the attributes of the mobile device include:
  an electronic serial numbers (ESN) associated with the mobile device,
  a mobile equipment identifier (MEID) associated with the mobile device, or
  an international mobile equipment identity (IMEI) associated with the mobile device.

13. The device of claim 12, wherein the attributes of the mobile device further include a class of service (COS) associated with the mobile device.

14. The device of claim 10, wherein the network associated with the device is a CDMA network.

15. The device of claim 10, wherein the non-SMS system is one of a multimedia messaging service center (MMSC) or a rich communication services (RCS) system.

16. A system, comprising:
a first device configured to:
  receive a mobile directory number (MDN) that has been identified as a mobile spam originator,
  generate a query for attributes of a mobile device registered with the MDN,
  send the query and the MDN to a non-SMS system,
  receive a query response including attributes of the mobile device,
  determine, based on the attributes of the mobile device, to block the mobile device from access to a network associated with the first device, and
  provide one or more of the attributes of the mobile device for use in a blacklist tracking system; and
a second device configured to:
  receive a request to activate a different MDN on the mobile device,
  generate a query to the blacklist tracking system that includes the one or more attributes of the mobile device,
  receive, from the blacklist tracking system, an indication that the mobile device is barred, and
  reject the request to activate the different MDN on the mobile device.

17. The system of claim 16, further comprising:
a third device configured to:
  receive an SMS message,
  determine that the SMS message is a spam message, and
  forward, to the first device, the MDN with an indication that the MDN is the mobile spam originator.

18. The system of claim 17, wherein the SMS message is a copy of an original SMS message.

19. The system of claim 16, wherein the attributes of the mobile device include:
  an electronic serial numbers (ESN) associated with the mobile device,
  a mobile equipment identifier (MEID) associated with the mobile device, or
  an international mobile equipment identity (IMEI) associated with the mobile device.

20. The system of claim 16, wherein the non-SMS system is one of a multimedia messaging service center (MMSC) or a rich communication services (RCS) system.

* * * * *